Feb. 17, 1970   G. FLEURY ET AL   3,496,331
ELECTRIC DEFROSTING FACILITY FOR ROTATING BLADE SYSTEMS
Filed Nov. 29, 1968   6 Sheets-Sheet 1
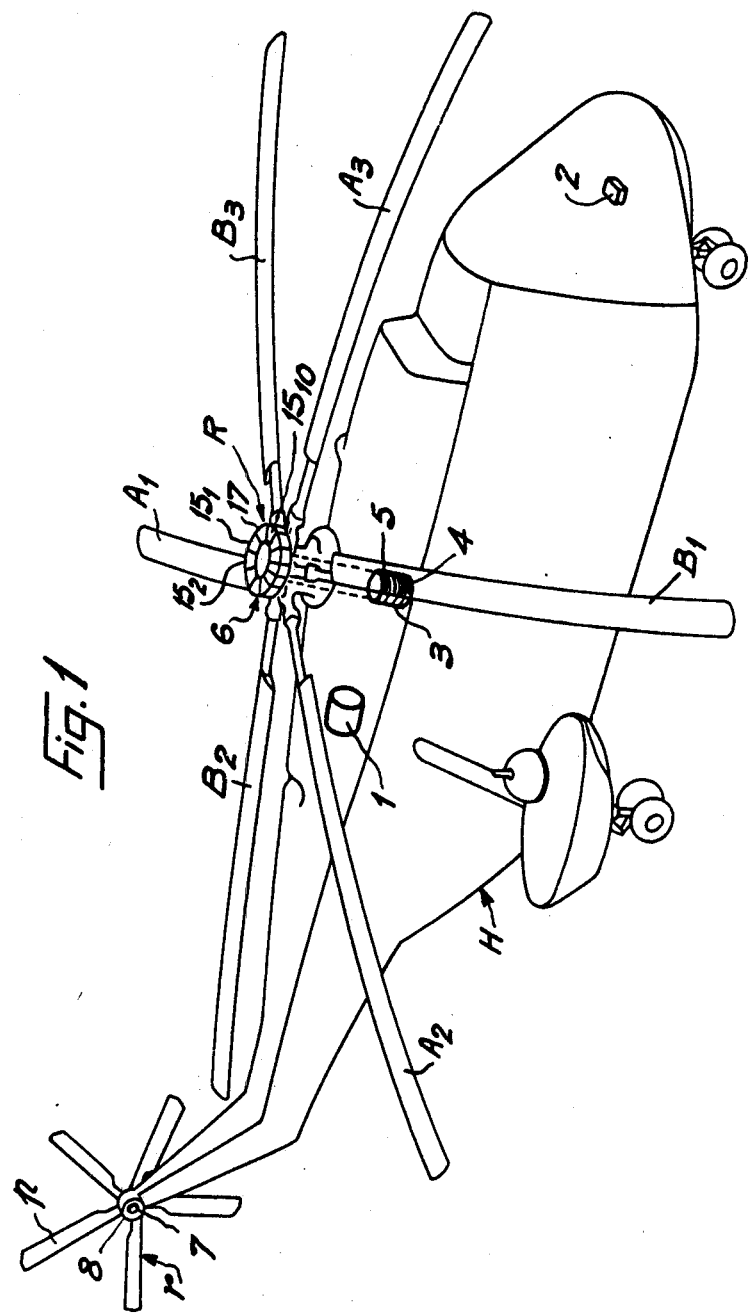

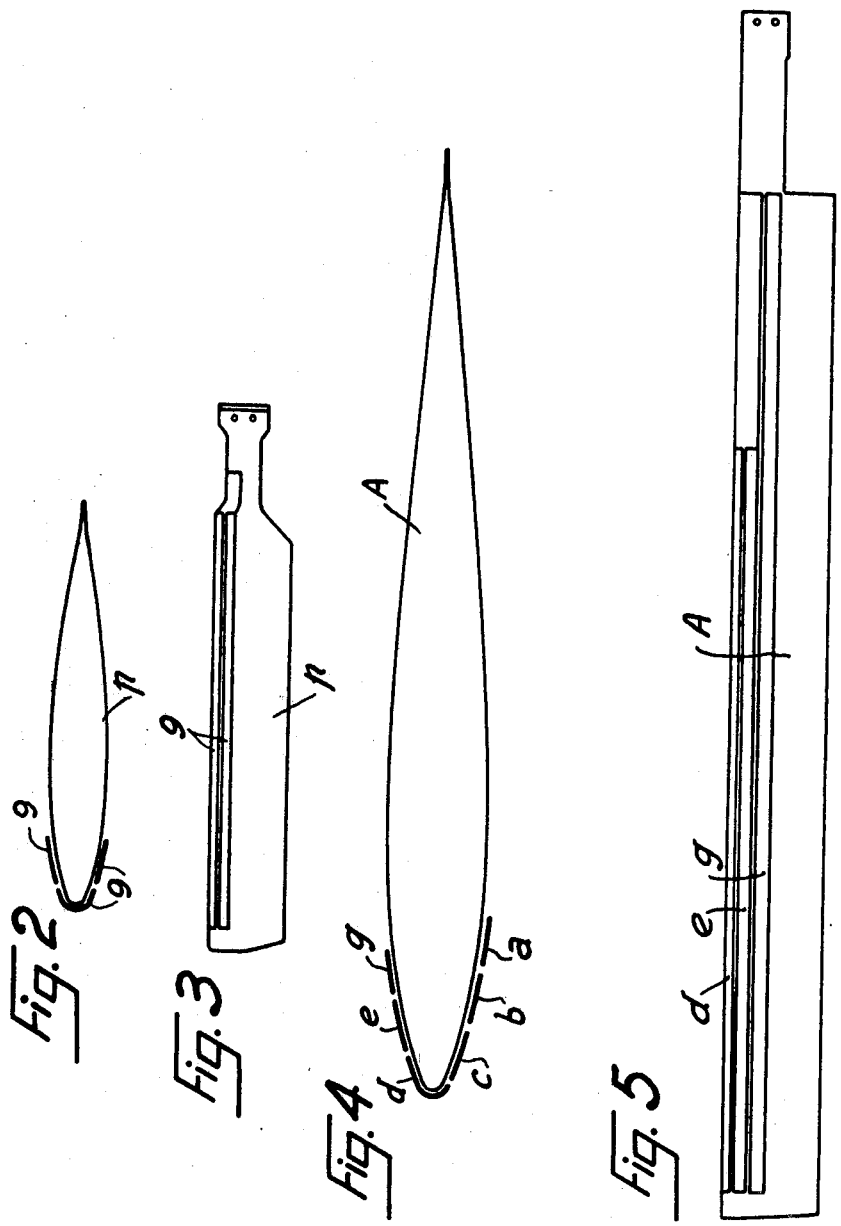

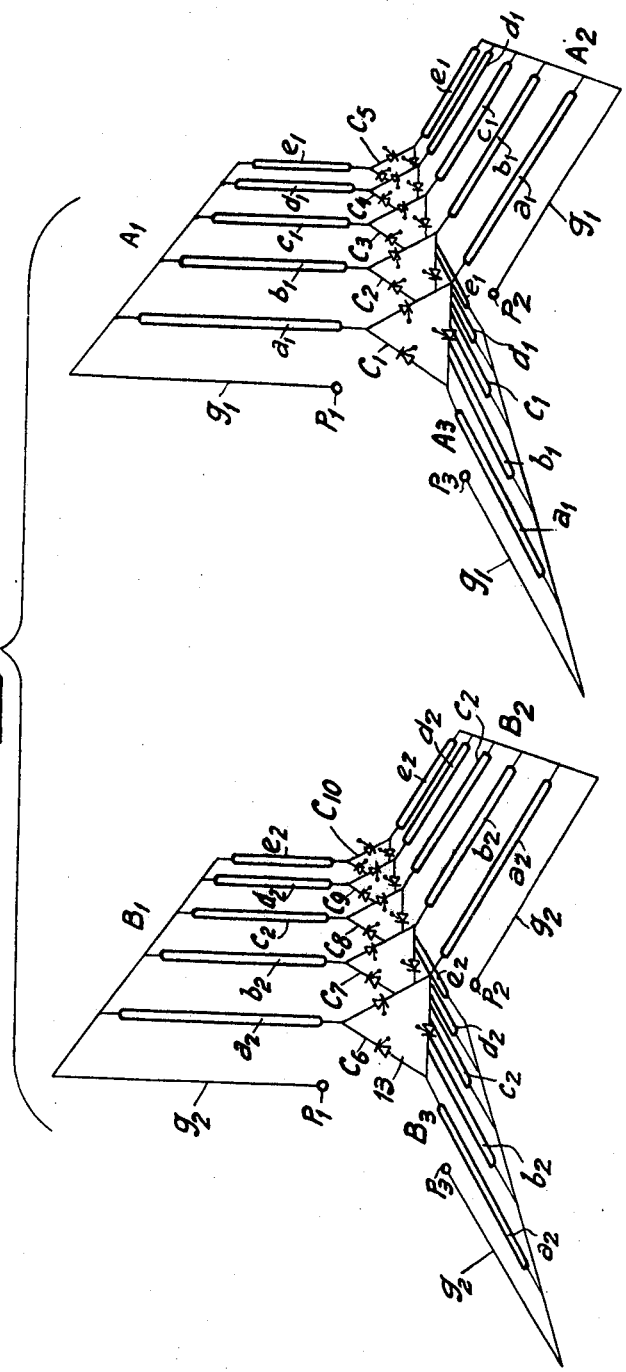

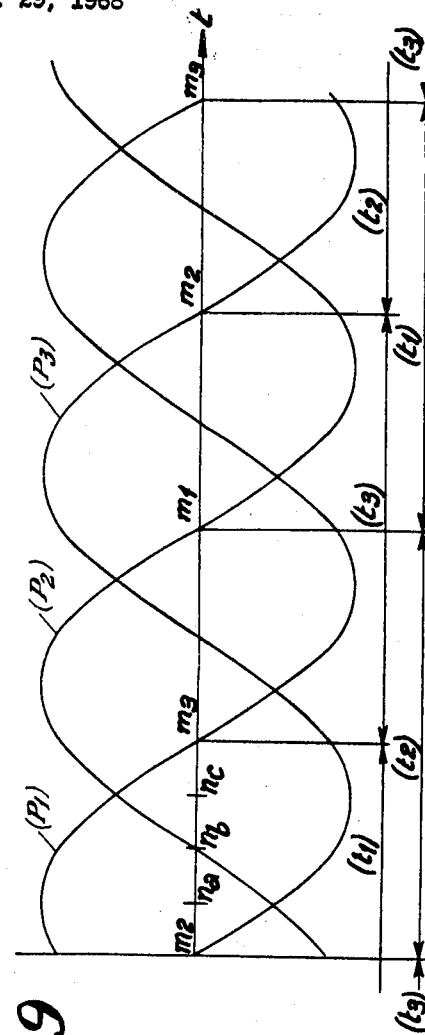
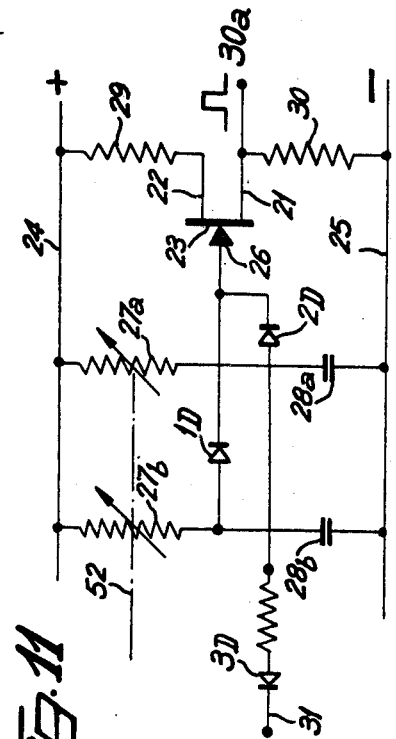
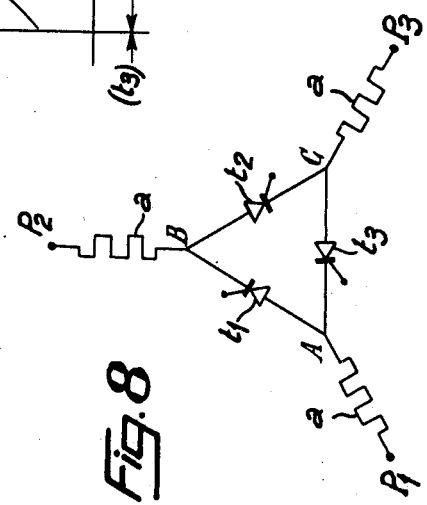

United States Patent Office 3,496,331
Patented Feb. 17, 1970

3,496,331
ELECTRIC DEFROSTING FACILITY FOR ROTATING BLADE SYSTEMS
Gerard Fleury, Marseille, and Marc C. A. Fourcade, St. Victoret, France, assignors to Sud-Aviation, Societe Nationale de Constructions Aeronautiques, Paris, France, a French body corporate
Filed Nov. 29, 1968, Ser. No. 780,007
Claims priority application France, Dec. 6, 1967, 131,137
Int. Cl. H05b 1/00, 3/00, 11/00
U.S. Cl. 219—201   11 Claims

ABSTRACT OF THE DISCLOSURE

A defrosting system for the rotating blade of a helicopter has a static switching system which enables groups of resistances to be cut-in in a predetermined cycle.

---

Figure 6:
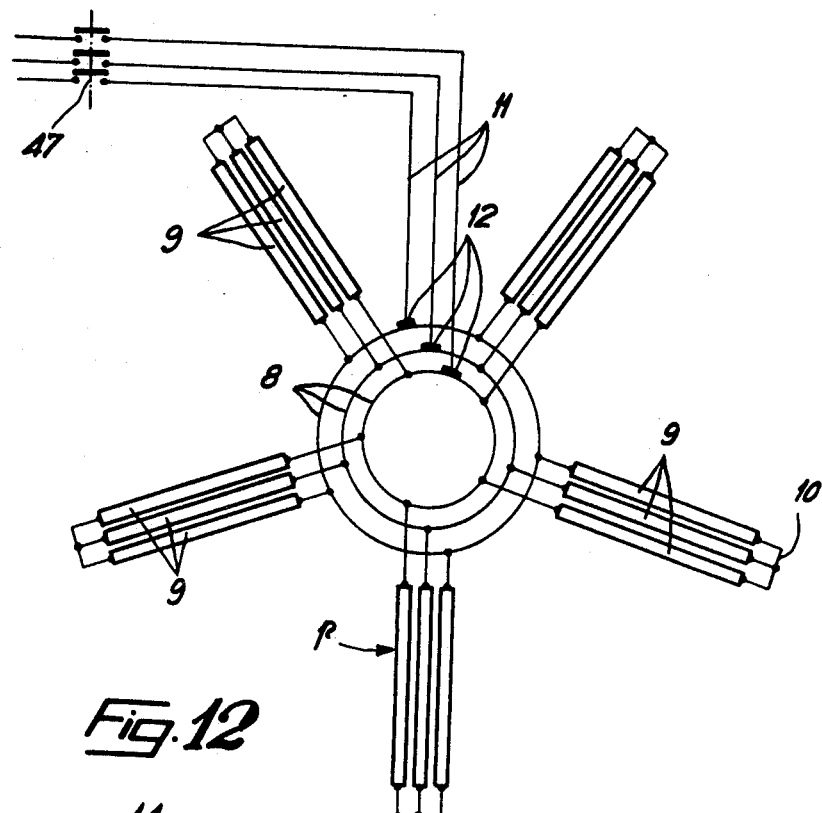

To defrost the rotating blade systems of helicopters, it is known to heat the leading edge of the blades by means of electrical resistances which are energised on a predetermined cycle. This step limits the power required for defrosting, a brief formation of ice on the blade edges being tolerated, the layer of ice in contact with the blade then being heated so that a thin film of water is formed between the layer of ice and the blade edge so that the ice disengages and is hurled away by centrifugal force. With a view to further reducing power requirements, it has also been suggested that the surfaces disposed on either side of the leading edge of each blade be divided into longitudinal strips or bands of heating resistances and that each such strip or band be energised consecutively so that any ice forming on the blade is unstuck in consecutive portions.

These steps are economical of power but are very difficult to embody with the use of conventional switching facilities, for either the switching facilities must be disposed on the rotating part, with difficulties due to cyclic control of the facility and to inertia forces acting on the controlled contacts, or the switching facilities must be disposed in a stationary part of the craft, in which event there must be a considerable increase in the number of current-transmitting rings between the stationary part and the rotating part since each ring can supply either just a single resistance or just a reduced number of resistances.

This invention relates to a static switching facility for the defrosting resistances of rotating blade systems, the facility according to the invention enabling groups of resistances to be cut-in on a predetermined cycle by electronic switching means mounted on the rotating part of craft having blade systems of the kind specified.

According to the invention, each group of like resistances belonging to a number of blades is energised by polyphase current having the same number of phases as there are resistances in the group, each such resistance having one phase supplied to its outer end, resistances of the same group being star-connected, at those of their ends which are near the hub, through the agency of a conductor which is closed on itself and which comprises a controlled rectifier preferably a thyristor, between two consecutive resistance connections, the various rectifiers being cut-in at the timing of phase-changing.

As will become apparent hereinafter, with a circuit arrangement of this kind all the A.C. can flow through the resistances with a number of controlled rectifiers equal to the number of phases, but if the rectifiers were disposed in the circuit of each phase they would pass only a single alternation of the A.C.—i.e, only half the A.C.

Also, the invention greatly simplifies assembly of the installation.

When each blade comprises a number of resistances disposed in longitudinal parallel strips or bands, the resistance outer ends are supplied in parallel through a common conductor and, if each group of like resistances is star-connected by a conductor forming a ring of thyristors, the thyristors of each such ring are cut-in seriatim by a stepping switch formed by a corresponding number of bistables also connected up as a closed ring, the changes of state of the bistables being controlled by consecutive pulses from a timer.

The following description, taken together with the accompanying exemplary non-limitative drawings, will make readily apparent how the invention can be carried into effect, features which are disclosed by the drawings and text forming of course part of the invention.

Figure 12:
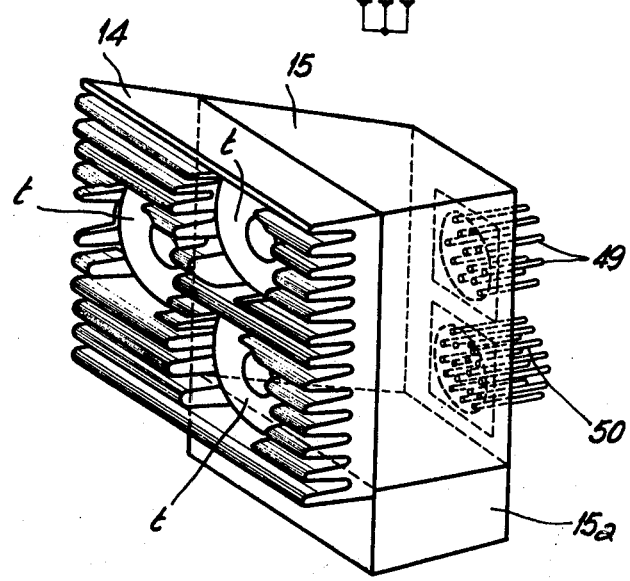
Figure 10:
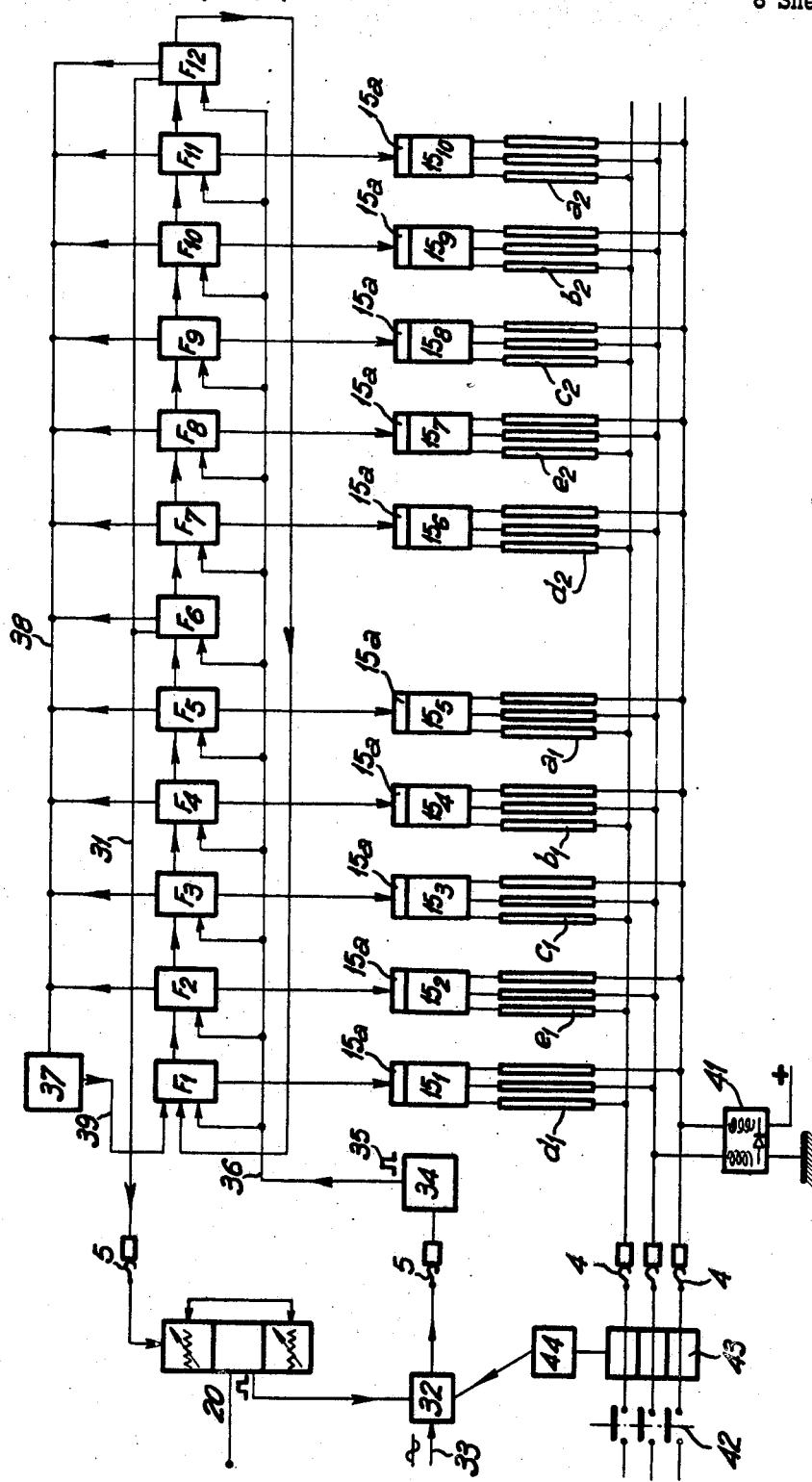

In the drawings:
FIGURE 1 shows a helicopter fitted with the defrosting system according to the invention;
FIGURE 2 is a section through a blade of the auxiliary rotor;
FIGURE 3 is a plan view corresponding to FIGURE 2;
FIGURE 4 is a section through a blade of the main rotor;
FIGURE 5 is a plan view corresponding to FIGURE 4;
FIGURE 6 is a circuit diagram for the auxiliary rotor defrosting facility;
FIGURE 7 shows how the main rotor heating resistances of FIGURE 1 are connected in the form of heating strips or bands such as are shown in FIGURES 4 and 5;
FIGURE 8 is a circuit diagram showing how the three heating resistances are star-connected through the agency of a ring of thyristors and a conductor closed on itself;
FIGURE 9 shows the operating diagram corresponding to FIGURE 8;
FIGURE 10 shows the diagram for controlling the energisation of the resistances shown in FIGURE 7;
FIGURE 11 is a circuit diagram showing details of a timer, and
FIGURE 12 is a perspective view showing the assembly of a thyristor group for star-connecting a resistance group.

A helicopter H shown in FIGURE 1 has a main rotor R and an auxiliary tail rotor r. In this case the main rotor has six blades divided into two groups of three $A_1$, $A_2$, $A_3$ and $B_1$, $B_2$, $B_3$, the blades of the two groups alternating with one another. The tail rotor r has five blades p.

Power for heating the blades of both rotors is supplied by a three-phase alternator 1 driven by the heat engine (not shown) which drives the two rotors through appropriate mechanical transmissions. Heating can be controlled by the pilot through the agency of a box 2 which has the starting switches, the tell-tales for supervising operation and the timers, to be described hereinafter, determining the operating times.

Current goes to the blades of rotor R through a collector 3 comprising three main rings 4, for the current of the three alternator phases, and a number of rings 5 (see also FIGURE 10) providing a connection between control box 2 and the static switching facilities grouped in ring 6. Only two rings 5 are shown in FIGURE 10 but their number may be higher if control circuits inessential for an explanation of the operation are provided.

The heating resistances of rotor r are energised through a collector 7 (shown in diagrammatic form) comprising only three power rings 8 (see FIGURE 6), since the auxiliary rotor blades are kept permanently free of frost by continuous heating to ensure that pieces of ice cannot be hurled off the auxiliary rotor r by centrifugal force and possibly damage the main rotor blades or hub. Accordingly, each auxiliary rotor blade $p$ (FIGURE 2) comprises three strips or bands 9 each formed by a heating resistance extending lengthwise of the blade $p$, the three resistances being, as can be seen in FIGURE 6, star-connected 10 at their outer ends, so that if their inner ends are connected one each to each of the three rings 8 of the collector 7 (FIGURE 1), the three resistances are continuously energised by the three-phase power supplied by the alternator 1. Also visible in FIGURE 6 are the three corresponding phase conductors 11, their brushes 12 and the contactor 47 which, under the control of box 2, supplies the resistances 9.

A main rotor blade A, such as is shown in section in FIGURE 4, comprises five heating resistance bands or strips $a$ to $e$ whose outer ends are connected to a common supply conductor $g$. To allow for differences between the speed of rotation of a blade tip and the speed of rotation at the central part of the blade, the bands $a$ to $e$ have a greater dissipation capacity at the centre of the rotor than near the end of the blade. To give some idea, this energy dissipation capacity can be about 3 w./cm.$^2$ near the blade tip and about 5 w./cm.$^2$ near the central part. This allows for the fact that it is more difficult to unstick ice by centrifugal force near the centre of the blade than at the blade tip.

The various resistances of the blades $A_1$ to $A_3$ and $B_1$ to $B_3$ are interconnected in the manner visible in FIGURE 7.

The supply conductors ($g_1$ for blade group $A_1$ to $A_3$ and $g_2$ for blade group $B_1$ to $B_3$) are connected to the three phases $P_1$, $P_2$, $P_3$ respectively so that the outer ends of the resistances $a_1$ to $e_1$ and $a_2$ to $e_2$ are supplied with one phase directly whereas their inner ends are closed in a star having three arms for each group or set of three resistances each belonging to a blade ($A_1$ to $A_3$ or $B_1$ to $B_3$) by a conductor 13 which is closed on itself and which comprises in series a thyristor $t$ in the conductor portion between the connection of the inner ends of two consecutive resistances. Consequently, in the example shown the system comprises ten groups $C_1$ to $C_{10}$ each of three thyristors connected as a closed ring.

As can be seen in FIGURE 12, the three thyristors $t$ of any group are arranged with their respective radiators 14 on the outer surface of a trapezoidal box 15 which has in its bottom part 15$a$ an electronic facility for in known manner cycling the three thyristors $t$ at the timing of the three phases, as will be described with reference to FIGURES 8 and 9. The ten boxes $15_1$ to $15_{10}$ form ten of the segments of the ring 6; the eleventh box 17 (FIGURE 1) contains inter alia the ring of step-by-step switching electronic bistables to be described with reference to FIGURE 10.

The ring segment boxes have connecting pins 49, 50 via which they are mounted and which enable them to be replaced, if need be, in the event of faulty operation.

Three resistances, as $a$ (shown in FIGURE 8), form a balanced reactance-free circuit arrangement supplied by the three phases $P_1$, $P_2$, $P_3$. The voltage variations of these phases are shown in FIGURE 9, which also shows the thyristor firing times and their consecutive conductive areas.

In the triangle A B C of the circuit arrangement shown in FIGURE 8, the current—assuming of course that each thyristor has been triggered beforehand and has no reverse voltage across it—flows only clockwise through the thyristors $t_1$, $t_2$, $t_3$. However, since there is a negligible voltage drop across a thyristor, so that the potential differences in the triangle A B C are always small, it will be apparent, if reference is made to the voltage diagram in FIGURE 9 (corresponding to the diagram of the current flowing through the three arms of the circuit arrangement) that the conductivity of two of the thyristors is such that the whole current can flow the whole time, for when any two thyristors are conductive the three phases are connected together and the sum of the three voltages—i.e., of the three currents—is zero at any time, whereas the third thyristor, being reverse-biased, cannot conduct.

The reason for this is that, assuming thyristor $t_1$ to be conductive, thyristor $t_2$ fires at a time $m_2$ (FIGURE 9) when phase $P_3$ is passing through zero and becoming negative. At this time the voltage of the phase $P_1$ (positive) which was equal to the voltage of the phase $P_2$ (negative) increases in absolute value over the voltage of phase $P_2$, so that the potential at B becomes positive whereas at C the potential starts to become negative. The thyristor $t_2$, having fired, therefore continues to conduct. However, since $P_1$ is positive and $P_3$ is negative, thyristor $t_3$ is reverse-biased and non-conductive.

Of course, this state of conductivity ($t_1$ and $t_2$ conductive and $t_3$ reverse-biased) continues at the times $n_a$ and $n_b$. After the time $n_c$ until the time $m_3$, the thyristors $t_1$ and $t_2$ still stay conductive, for although the voltage at B becomes greater than the voltage at A, the voltage at C is negative enough to lower the potential of B below the potential of A. This situation ceases at the time $m_3$, when the voltages at B and C become equal in absolute value, whereas at A the voltage is zero and will become negative. The thyristor $t_1$ then starts to experience a reverse voltage and can no longer conduct, but for the reasons just given in respect of thyristor $t_2$, thyristor $t_3$ can now become conductive, and so on. At each third of a voltage period one thyristor fires and another ceases to conduct.

Consequently, each thyristor fires when the voltage of the phase connected to its particular cathode passes through zero, the thyristor then remaining conductive for two-thirds of a period, so that two thyristors are always conductive if the third is reverse biased for one-third of a period, so that the current flow can be interrupted when the periodic firing of the thyristors ceases.

As already stated, each casing 15 has in its bottom part 15$a$ one of the many known electric circuit arrangements enabling a three-phase current to trigger a pulse for firing a corresponding thyristor when each of the three A.C. phase voltages becomes zero.

Under the control of the circuit arrangement shown in FIGURE 10, current can consecutively energise the groups of three resistances corresponding to the blades $A_1$ to $A_3$ and then, after a pause, the groups of three resistances corresponding to the blades $B_1$ to $B_3$, and then, after another pause, the energisation cycle of these resistances can resume.

Operation of the system shown in FIGURE 10 is under the control of the timer 20, a simplified diagram of which is shown in FIGURE 11. Two bases 21, 22 of a unijunction transistor 23 are disposed between D.C. supply conductors 24, 25. The potential of emitter 26 of transistor 23 is controlled by two parallel time bases each comprising a resistance 27$a$, 27$b$ and a capacitor 28$a$, 28$b$ respectively. The resistances 27$a$, 27$b$ are variable so that the relaxation periods of the system can be varied. The relaxation time given by the time base 27$a$, 28$a$ is shorter than the relaxation time given by the time base 27$b$, 28$b$. The first time base 27$a$, 28$a$ determines the heating time of each group of three resistances. When capacitor 28$a$ is charged, the potential of emitter 26 becomes high enough for the current to flow almost on short circuit through the resistances 29, 30. A pulse is sampled from one of these two resistances at a place 30$a$. However, this current flow also discharges capacitor 28$b$ so that time base 27$b$, 28$b$ cannot operate when time base 27$a$, 28$a$ is in operation to determine the relaxation time of the system.

Conductivity of the circuit 27$a$, 28$a$ is controlled via line 31 which is earthed when the bistables change over to give a brief pause in the heating (bistables $F_6$ and $F_{12}$ in FIGURE 10). Capacitor 28$a$ is therefore short-circuited and the potential of its positive plate stays near earth potential. Time base 27$a$, 28$a$ therefore ceases to be able to prepare the voltage triggering the unijunction transistor 23. Consequently, time base 27b, 28b, which is longer than time base 27a, 28a, can now prepare the unijunction transistor triggering voltage whose recurrence rate corresponds to the length of the pause in heating. Diodes 1D, 2D and 3D make the two time bases independent of one another. When line 31 ceases to be earthed, time base 27a, 28a cuts in again.

Advantageously, the short period associated with time base 27a, 28a is given a number of values graded, e.g. between ten and thirty seconds, corresponding to heating times for each of the groups of three resistances, the heating times being longer in proportion as the outside temperature is lower. For satisfactory operation, the times given by time base 27b, 28b must in each case have values above the corresponding values chosen for time base 27a, 28a. The two resistances can be switched simultaneously, thus ensuring satisfactory association of their respective values, by a single switch diagrammatically represented by a broken line 52. Preferably, to allow for a timer failure the box 2 contains two such switchable timers, and the box has a "go" telltale for each of them.

The pulses delivered by timer 20 (FIGURE 10) go to a modulator 32 which, as diagrammatically represented at 33, receives one of the phases of the alternator operating e.g. on 400 Hz. Each timer pulse is therefore converted into a sequence of brief large-amplitude sinusoidal pulses. Consequently, the modulator 32 delivers a strong pulse train so that even though arcing occurs between the contact ring 5 and the rotating part, at least one of the pulses is virtually certain to reach the ring and go to the demodulator 34. Upon receiving one of these powerful pulses, the demodulator 34 delivers a pulse 35 which goes via line 36 to the stepping switch formed by the closed ring of bistables $F_1 \ldots F_{12}$.

The demodulator 34 comprises a bistable (not shown) which cuts the bistable off upon the formation of a pulse 35 for a time just longer than the duration of a sinusoidal pulse train. There is therefore no risk of a number of pulses 35 appearing in association with any single pulse train.

Since each heating period lasts for at least about 10 seconds, uncertainty about the time at which a pulse 35 appears, the uncertainty being of the order of a few alternator periods, is clearly unimportant.

The input of each of the bistables $F_1 \ldots F_{12}$ is so controlled by an and-gate (not shown) that each bistable changes over upon simultaneous receipt of a signal from the immediately previous bistable and of a pulse via the line 36. As previously described with reference to FIGURE 11, the timer 20 normally delivers pulses at the frequency determined by time base $27_a$, $28_a$—i.e., at the higher frequency.

The system also comprises a starting circuit 37 which is cut off, via line 38, by at least one of the voltages output by the bistables $F_1$ to $F_{12}$ when the same have changed over to the operating state. The circuit 37 therefore delivers a voltage only when the latter bistables are in their normal state. This voltage, which is transmitted via conductor 39 and which is needed for the bistable $F_1$ to change over, ensures that the pulse cycle determining consecutive heating periods must start with the bistable $F_1$.

When the bistables $F_1$ to $F_5$ have changed over stepwise on receipt of the pulses spaced apart by the length of the heating period, bistable $F_5$ causes bistable $F_6$ to change over, and, as already stated, bistable $F_6$ acts via conductor 31 to earth capacitor 28a on the short time base, so that the next pulse reaches bistable $F_7$ only after the time determined by a time base 27b, 28b, i.e., after an inoperative time. Upon receipt of the corresponding pulse the bistable $F_7$ changes over, bistable $F_6$ returns to normal and pulse spacing is again determined by the heating time until bistable $F_{12}$ changes over, whereafter operation of the short time base is cut off.

Each of bistables $F_1$ to $F_5$ is connected to one of the synchronised circuits (contained in portion 15a of the boxes 15) which supply the pulses for firing the thyristors $t$ of the boxes $15_1$ to $15_5$, the thyristors star-connecting the resistance groups in the order $d_1$, $e_1$, $c_1$, $b_1$, $a_1$. Similarly, the bistables $F_7$ to $F_{11}$ control the systems $15_6$ to $15_{10}$ whose thyristors star-connect the groups of resistances in the order $d_2$, $e_2$, $c_2$, $b_2$, $a_2$. Consequently, the step-by-step switching provided by the bistable ring cuts-in the various resistances of the main rotor blades consecutively and in the sequence given.

All the bistables $F_1 \ldots F_{12}$, the starting circuit 37 and demodulator 34 are contained in the eleventh segment 17 of ring 6. Segment 17 also contains the power pack 41 which is connected between two phases and supplies the rotating part with the D.C. required for the various electronic systems.

The timer 20 (which may or may not be provided in duplicate), the modulator 32 and the switch controlling the convectors 42, 47 are included in the control box 2 (FIGURE 1).

A set of current transformers 43 can, if required, be provided between the alternator and the collector rings. Upon overcurrent being detected, corresponding to a short circuit in one of the resistance groups, the over-current causes system 44 to deliver a pulse which goes to the modulator 32 so that a pulse causing the cycle to advance by one step is delivered immediately. There is therefore no risk of one or more items of the installation being destroyed by short-circuiting or by overheating.

The overcurrent detector 44 can also initiate a warning signal and possibly interrupt the power supply.

Of course, modifications can be made to the embodiments hereinbefore described, inter alia by the substitution of equivalent technical means, without for that reason departing from the scope of this invention.

We claim:

1. An electric defrosting arrangement for a rotating aerofoil, the arrangement comprising cyclically energised heating resistances disposed along blade length wherein groups of like resistances each belonging to a number of blades is energised by polyphase current having the same number of phases as there are resistances in the group, each such resistance having one phase supplied to its outer end, resistances of the same group being star-connected at those of their ends which are near the hub, through the agency of a conductor which is closed on itself and which comprises a controlled rectifier between two consecutive resistance connections, the various rectifiers being cut-in at the timing of phase-changing by electronic means borne by the hub of the rotating blade system.

2. The arrangement specified in claim 1 wherein the controlled rectifiers are thyristors.

3. The arrangement specified in claim 2 wherein each blade comprises a number of heating resistances energised in parallel from the outer end through a common conductor; and like resistances belonging to a number of blades are respectively star-connected, the control rectifiers which belong to each star closing conductor being operated serially by a stepping switch.

4. The arrangement specified in claim 3 wherein the stepping switch comprises bistables which are provided to a number corresponding to the number of groups and which are connected as a closed ring and which are mounted on the rotating blade system and which receive control pulses from a timer cyclically mounted in the craft.

5. The arrangement specified in claim 4 wherein the timer comprises a unijunction transistor whose triggering is under the control of two time bases formed by two parallel-connected resistance-capacity circuits, the first time base corresponding to the time when current is flowing through the resistances, the second time base having a longer time constant than the first time base, the bistable ring comprising at least one complementary bistable connected to the timer to cut-out the first time base so that an inoperative period longer than the heating periods appears between two sequences of the heating periods.

6. The arrangement specified in claim 2 wherein the thyristors belonging to a single star-closing conductor are mounted outside of a casing, the various casings each belonging to a group of resistances forming a ring around the hub of the rotating blade system, the thyristors being disposed on the periphery of the ring.

7. The arrangement specified in claim 1 wherein the resistances have a three-phase energisation and are grouped in threes, and the three star-closing controlled rectifiers of three resistances are triggered at the passage through zero of each of the three phases.

8. The arrangement specified in claim 4 wherein the pulses from the timer are modulated at the timer output by a relatively high-frequency A.C. phase and then supplied, via a contact rubbing on a contact ring of the rotating blade system, to a demodulator adapted to restore the initial pulse and direct the same, in that part of the installation which rotates with the blade system, towards the ring of bistables.

9. The arrangement specified in claim 4 wherein the ring of bistables is associated with a starting circuit closed, when the bistables are in operation, by all the bistables of the ring except one, which thus receives a control voltage from the starting circuit when all the other bistables are in the normal state.

10. The arrangement specified in claim 1 wherein the polyphase supply wiring for the heating resistances extends through a set of current transformers associated with a circuit arrangement which, in the event of overcurrent, delivers a pulse to the ring of bistables.

11. The arrangement specified in claim 1 wherein the rotating blade system is the rotating blade system of a helicopter also comprising an auxiliary anti-torque rotor having continuously energised heating resistances.

References Cited

UNITED STATES PATENTS

| | | | |
|---|---|---|---|
| 2,466,238 | 4/1949 | Hoof. | |
| 2,625,661 | 1/1953 | Haydon | 219—486 X |
| 3,002,718 | 10/1961 | Hackenberger | 244—134 |
| 3,205,378 | 9/1965 | Kline | 307—132 X |
| 3,325,657 | 6/1967 | Corey | 307—141 X |

JOSEPH V. TRUHE, Primary Examiner

P. W. GOWDEY, Assistant Examiner

U.S. Cl. X.R.

219—486, 492, 501, 508; 244—134; 307—141